US011066030B2

(12) United States Patent
Kolatschek et al.

(10) Patent No.: US 11,066,030 B2
(45) Date of Patent: Jul. 20, 2021

(54) METHOD AND CONTROL DEVICE FOR CONTROLLING AT LEAST ONE OCCUPANT PROTECTION DEVICE FOR A VEHICLE DURING A COLLISION, AND SYSTEM FOR OCCUPANT PROTECTION FOR A VEHICLE

(71) Applicant: Robert Bosch GmbH, Stuttgart (DE)

(72) Inventors: Josef Kolatschek, Weil der Stadt (DE); Gunther Lang, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 67 days.

(21) Appl. No.: 16/657,512

(22) Filed: Oct. 18, 2019

(65) Prior Publication Data
US 2020/0130626 A1    Apr. 30, 2020

(30) Foreign Application Priority Data
Oct. 24, 2018   (DE) .......................... 102018218168.3

(51) Int. Cl.
*B60R 21/015* (2006.01)
*B60R 21/013* (2006.01)
*B60R 21/01* (2006.01)

(52) U.S. Cl.
CPC ...... *B60R 21/01542* (2014.10); *B60R 21/013* (2013.01); *B60R 21/01554* (2014.10); *B60R 2021/01211* (2013.01); *B60R 2021/01286* (2013.01)

(58) Field of Classification Search
CPC ........ B60R 21/01542; B60R 21/01554; B60R 21/013; B60R 2021/01211; B60R 2021/01286
USPC ......................................................... 701/45
See application file for complete search history.

(56) References Cited

U.S. PATENT DOCUMENTS

2016/0257273 A1* 9/2016 Tada ................. B60R 21/01512

FOREIGN PATENT DOCUMENTS

DE      102014010200 A1    12/2014
DE      102014000842 A1    7/2015

* cited by examiner

*Primary Examiner* — Gertrude Arthur Jeanglaude
(74) *Attorney, Agent, or Firm* — Norton Rose Fulbright US LLP; Gerard Messina (57) ABSTRACT

A method for controlling at least one occupant protection device for a vehicle in the case of a collision, including determining input data which represent an ignition time of an airbag of the vehicle, an angular frequency of the collision, an available displacement path of a vehicle occupant relative to the vehicle, a mass of the vehicle occupant of the vehicle, a distance of the vehicle occupant from the airbag, and an inflation time duration of the airbag; ascertaining a restraint force using the input data. The restraint force represents a force that can be provided by the at least one occupant protection device and that is suitable to minimize an occupant energy of the vehicle occupant up until the end of the collision; and providing a control signal for controlling the at least one occupant protection device, the control signal being produced using the restraint force.

13 Claims, 3 Drawing Sheets

METHOD AND CONTROL DEVICE FOR CONTROLLING AT LEAST ONE OCCUPANT PROTECTION DEVICE FOR A VEHICLE DURING A COLLISION, AND SYSTEM FOR OCCUPANT PROTECTION FOR A VEHICLE

CROSS REFERENCE

The present application claims the benefit under 35 U.S.C. § 119 of German Patent Application No. DE 102018218168.3 filed on Oct. 24, 2018, which is expressly incorporated herein by reference in its entirety.

FIELD

The present invention relates to a device and a method for controlling at least one occupant protection device for a vehicle during a collision. The present invention also related to a computer program.

BACKGROUND INFORMATION

In particular for motor vehicles, various occupant protection devices may be provided in order to offer protection against injury for vehicle occupants in the case of a collision. German Patent Application No. DE 10 2014 000 842 B4 describes a method that uses a so-called pre-crash sensor system to detect an impending collision, predicts a path D traveled during the collision and a maximum forward displacement path $S_0$ of a vehicle occupant having a mass m, and calculates a threshold value $F_0$ to which the restraint force is regulated, the equation $F_0=m \cdot v_0^2/(2 \cdot (D+S_0))$ being used for the calculation. German Patent Application No. DE 10 2014 010 200 A1 describes a method in which a collision of a vehicle is acquired, a vehicle collision path is predicted made up of a path of an occupant inside the vehicle and a deformation path, and from this a guide variable for controlling the restraint device is formed.

SUMMARY

The present invention provides a method and a control device that uses this method, a system, and, finally, a corresponding computer program. Advantageous developments and improvements of the device indicated described herein are enabled by the measures described herein.

In particular, according to specific embodiments, during a collision of a vehicle a personalized accident severity level is determined for passive safety or for the controlling of a restraint device. For this purpose, for example a specific realization of a fundamental physical relationship can be created as a technical application, through model-based combination of measurement values for determining an accident severity that is individual for each occupant and for each position inside the vehicle, in order to control actuators for protecting persons in accident situations. More precisely, here in particular a time of ignition of an airbag of the vehicle, an angular frequency of the collision, an available displacement path of a vehicle occupant relative to the vehicle, a mass of the occupant of the vehicle, a distance of the vehicle occupant from the airbag, and an inflation time duration of the airbag can in particular be used as input data.

Advantageously, according to specific embodiments in particular universally applicable, fundamental physical relationships can be used, and a specific adaptation to particular vehicles via parameter settings can advantageously be omitted, because the underlying principles are generally applicable. For example, through the application of a model-based relationship in order to link the input data, a high degree of robustness and a thoroughly explicable and verifiable behavior of the occupant protection system can be achieved. A controlling of occupant protection devices or restraint devices can be simplified. In addition, it is for example possible to realize a controlling that puts the minimum load on the occupants in the circumstances that arise in the collision. In addition, the determination of the accident severity does not have to take place until an occupant protection device, or restraint device, actually has to be activated, i.e., at the latest possible time. In this way, for example a maximum quantity of information can be used to determine the accident severity, and the determination of the accident severity can thus be optimized, or optimal, at the time of decision.

According to specific embodiments in particular an accident severity can be determined explicitly quantitatively. In addition, specific embodiments can for example be independent of a so-called pre-crash sensor system, or pre-impact sensor system, or predictive sensor system, or practicing sensor system. A correct controlling of occupant protection devices for different kinds of collisions can also be realized. In addition, according to specific embodiments it can in particular also be avoided that approximations are carried out over weighting functions and discrete boundary curves are used, so that the precision of the occupant protection is increased, and general applicability can be expanded. In addition, the outlay for realizing or implementing specific embodiments can be kept low, or reduced.

A method is presented for controlling at least one occupant protection device for a vehicle in case of a collision, the method having the following steps:

determining input data, the input data representing a time of ignition of an airbag of the vehicle, an angular frequency of the collision, an available displacement path of a vehicle occupant relative to the vehicle, a mass of the occupant of the vehicle, a distance of the vehicle occupant from the airbag, and an inflation time duration of the airbag;

ascertaining a restraint force using the input data, the restraint force representing a force that can be provided by the at least one occupant protection device, the force being suitable to minimize an occupant energy level of the vehicle occupant up until the end of the collision; and providing a control signal for controlling the at least one occupant protection device, the control signal being produced using the restraint force.

This method can be implemented for example in software or hardware or in a mixed form of software and hardware, for example in a control device. The vehicle can be a motor vehicle, in particular a passenger vehicle, a truck, or some other utility vehicle. The collision can take place between the vehicle and a collision object, which can be a stationary object or another vehicle. The at least one occupant protection device can be designed to apply the ascertained restraint force in order to minimize the occupant energy in response to, or using, the control signal. The airbag can represent an occupant protection device. In the step of provision, a control signal can be provided that brings about an application of the restraint force by the at least one occupant protection device when used by the at least one occupant protection device. At least one computing rule can be used in the step of determining and in the step of ascertaining respectively. In the step of provision, the control signal can be provided in order to control at least one restraint device, at least one adjustable absorber device for absorbing a quantity of collision energy, a retractable steering wheel, a retractable instrument panel, a movable vehicle seat, and, in addition or alternatively, an operating brake of the vehicle. The restraint force can be an average restraint force. The restraint force can represent an accident severity, in particular a personalized and, in addition or alternatively, situation-specific accident severity or collision severity.

According to a specific embodiment, in the step of ascertaining the restraint force can be ascertained using a relation of the form $$\overline{F}(TTF, \omega, s_{int}, m_{occ}, \Delta s, \Delta t) = \frac{\frac{1}{2} m_{occ} \cdot \left( \frac{6 \Delta s}{\omega (TTF + \Delta t)^3} \right)^2}{\frac{6 \Delta s}{\omega (TTF + \Delta t)^3} + \omega^2 s_{int}}$$

where F represents the restraint force, TTF represents the ignition time, ω represents the angular frequency, $s_{int}$ represents the displacement path, $m_{occ}$ represents the mass, Δs represents the distance, and Δt represents the inflation time duration. The relation can be realized via a mathematical function of the form indicated above, or some other function. Such a specific embodiment offers the advantage that the input data can be ascertained easily and, in addition or alternatively, early enough that an accident severity, or collision severity, can be determined quickly and precisely. Because the restraint force, as initial variable, is a continuous physical variable, on this basis a large number of actuators can be controlled without additional outlay for adaptation and application.

Also in the step of determination, the input data can be determined using at least one sensor signal of at least one vehicle sensor, using at least one modeling parameter of a vehicle model, of an occupant model, and, in addition or alternatively, of a collision model, and, in addition or alternatively, using at least one preset value for the input data. Such a specific embodiment offers the advantage that the data available for a respective application can be taken into account and used in a manner suitable for ascertaining the restraint force as precisely and reliably as possible.

In addition, in the step of determination, the angular frequency can be determined from a multiplicity of preset values or value ranges that are predefined as a function of a recognized collision type. Here, the angular frequency can be determined using a sensor signal of at least one acceleration sensor or other collision sensor. Such a specific embodiment offers the advantage that a type of collision can be taken into account easily in the ascertaining of the accident severity.

The type of collision can be recognized using at least one sensor signal of at least one vehicle sensor for collision acquisition, and, in addition or alternatively, for acquiring the surrounding environment. Such a specific embodiment offers the advantage that the angular frequency can be determined simply, precisely, and reliably.

In the step of determining, the displacement path can also be read in as a preset value, and, in addition or alternatively, can be determined using at least one vehicle sensor. In addition or alternatively, the distance can be read in as a preset value, and, in addition or alternatively, can be determined using at least one vehicle sensor. In addition or alternatively, the mass can be determined using a weight determining device of the vehicle. In addition or alternatively, the ignition time can be read in as a value stored in the vehicle. In addition or alternatively, the inflation time duration can be read in as a value stored in the vehicle. A vehicle sensor can be a camera, in particular a video camera, a radar sensor, a seat position sensor, an ultrasound sensor, or the like. Such a specific embodiment offers the advantage that a personalized accident severity can be ascertained reliably and precisely, even with prespecified or stored values, and also using a sensor system. Individual properties of the occupants, such as mass or seat position, can be used for the determination of the individual accident severity, so that the complexity of the ascertaining of the accident severity can be reduced.

In a specific embodiment, using only a sensor installed in the vehicle, for example an acceleration sensor for acquiring a longitudinal acceleration or acceleration of the vehicle in the longitudinal direction (Acc-X), the method can enable a determination of the accident severity with high quality. Here, such a sensor can enable a determination of the angular frequency. The inclusion of data from additional sensors, such as a transverse acceleration (Acc-Y), peripheral sensors, such as up-front sensors, side sensors in the x direction and the y direction, and pre-crash sensors, such as radar, video, and/or lidar, can easily be realized and can increase the quality of the determination of the accident severity.

According to a specific embodiment, in the step of provision a control signal can be provided that, as a function of at least one threshold value decision, brings about a controlling of at least one occupant protection device of a plurality of occupant protection devices of various types and, in addition or alternatively, at different positions in the vehicle. Here, in the at least one threshold value decision the ascertained restraint force can be compared with at least one threshold value. Such a specific embodiment offers the advantage that, from a plurality of occupant protection devices, at least one suitable device can be selected in order to increase occupant protection.

In addition, in the step of provision, a control signal can be provided that brings about a controlling of at least one occupant protection device at a time that is a function of at least one threshold value decision. Here, in the at least one threshold value decision the ascertained restraint force can be compared with at least one threshold value. Such a specific embodiment offers the advantage that the at least one occupant protection device can be triggered at a time that is suitable relative to the ascertained restraint force in order to offer increased occupant protection.

In addition, in the step of provision a control signal can be provided that brings about a controlling of at least one occupant protection device using a mathematical function of the ascertained restraint force. Here, mathematical function can have at least one parameter that is a function of a preset rule, of at least one property of the vehicle occupant, and, in addition or alternatively, of a temperature in an interior compartment of the vehicle, and, in addition or alternatively, in a surrounding environment of the vehicle. The at least one property of the vehicle occupant can represent an acquired state of clothing of the vehicle occupant. There can also be a relation between a temperature in the interior compartment and, in addition or alternatively, in the surrounding environment of the vehicle and the at least one property of the vehicle occupant. Such a specific embodiment offers the advantage that the controlling of the at least one occupant protection device can take place still more accurately and more precisely in relation to a specific accident situation.

In addition, in the step of ascertaining, the restraint force can be ascertained as a function of the position of a seat of the vehicle occupant. Here, in the step of providing, a control signal that is a function of a position of a seat of the vehicle occupant can be provided. A control signal can also be provided for each occupant of the vehicle. Such a specific embodiment offers the advantage that a seat position of each vehicle occupant can also be taken into account in the controlling, using a specifically tailored restraint force.

The approach presented here also provides a control device that is designed to carry out, control, or implement the steps of a variant of a method provided here, in corresponding devices. Through this variant embodiment of the present invention in the form of a control device as well, the object of the present invention can be realized quickly and efficiently.

For this purpose, the control device can have at least one computing unit for processing signals or data, at least one storage unit for storing signals or data, at least one interface to a sensor or to an actuator for reading in sensor signals from the sensor or for outputting control signals to the actuator, and/or at least one communication interface for reading in or outputting data that are embedded in a communication protocol. The computing unit can be for example a signal processor, a microcontroller, or the like, and the storage unit can be a flash memory, an EEPROM, or a magnetic storage unit. The communication interface can be designed to read in or output data wirelessly and/or in wire-bound fashion, and a communication interface that can read in or output wire-bound data can for example read in these data electrically or optically from a corresponding data transmission line or can output them to a corresponding data transmission line.

In the present description, a control device can be understood as an electrical device that processes sensor signals and outputs control signals and/or data signals as a function thereof. The control device can have an interface that can be realized as hardware and/or as software. In the case of a realization as hardware, the interfaces can be for example part of a so-called system ASIC containing a wide variety of functions of the control device. However, it is also possible for the interfaces to be separate integrated circuits, or to be made up at least partly of discrete components. In the case of a realization as software, the interfaces can be software modules present for example on a microcontroller alongside other software modules.

In an advantageous embodiment, the control device provides a controlling of at least one occupant protection device, in particular at least one restraint device, and operating brake, or the like. For this purpose, the control device can for example access sensor signals such as image signals and acceleration signals, model data, preset data, and, in addition or alternatively, predefined values stored in the vehicle. The controlling takes place via actuators such as belt tighteners, airbag triggering devices, operating brakes, and the like.

A system is also presented for occupant protection for a vehicle, the system having the following features:
a specific embodiment of the control device named above; and the at least one occupant protection device, the at least one occupant protection device being capable of being connected, or being connected, to the control device so as to be capable of transmitting signals.

Thus, in the system a specific embodiment of the control device named above can be advantageously used in order to control the at least one occupant protection device when there is a collision. At least one device or interface can also be provided for receiving or reading in information for determining the input data, and the at least one interface can be realized as a part of the control device or can be capable of being connected, or can be connected, to the control device so as to be capable of transmitting signals.

Also advantageous is a computer program product or computer program having program code that can be stored on a machine-readable carrier or storage medium, such as a semiconductor memory, a hard disk memory, or an optical memory, and can be used to carry out, realize, and/or control the steps of the method according to one of the specific embodiments described above, in particular when the program product or program is run on a computer, a control device, or a device.

Exemplary embodiments of the present invention are shown in the figures and are explained in more detail below.

DETAILED DESCRIPTION OF EXAMPLE EMBODIMENTS

Before exemplary embodiments are described in more detail in the following, first some fundamental principles and background information are briefly explained, only as examples, and in relation to exemplary embodiments.

The kinetic energy E of a moving body can be expressed by the equation $E=\frac{1}{2}mv^2$, where m is the mass of the body and v is its speed, relative to a particular reference system. The concept of work refers to a relation between an acting force F and a path s on which the force acts with this energy E. Here, the work that has to be performed in order to bring this body to a state of rest in the selected reference system is given by $W=F \cdot s=\frac{1}{2}mv^2=E$. Consequently, in order to bring an occupant, sitting in a vehicle that undergoes a change in speed v in a collision, to the speed v=0, the restraint force F is required over the path s. If, in this case, s is the maximum path that can be traveled by the occupant, made up of the deformation $s_{defo}$ of the vehicle and the path $s_{int}$ available in the interior compartment of the vehicle, then this is also the lowest possible force acting on the occupant that can bring this about. Thus, as solution of the problem the required force results according to the equation $$F = \frac{E}{s} = \frac{\frac{1}{2}mv^2}{s_{defo} + s_{int}}.$$

Put simply, the force F that has to be applied in order to bring a moving body to a state of rest is $$F = \frac{E}{s},$$

where E is the kinetic energy of the body having mass m and s is the path over which the force F is applied.

Transferring this to the subject of passive safety, where the problem arises of bringing an occupant to a state of rest in the case of a collision through the application of a force by the restraint system, this can be expressed as follows:

$$\overline{F} = \frac{E_{occ}}{s_{defo} + s_{int}}.$$

Here $E_{occ}$ is the kinetic energy of the occupant who has to be brought to rest, $s_{defo}$ is the deformation of the object or objects involved in the collision, which for the occupant contribute to the so-called ride down space, and $s_{int}$ is the usable forward displacement of the occupant in the interior compartment. The overall path on which the average restraint force $\overline{F}$ can act is accordingly $s = s_{defo} \, s_{int}$. Because the energy of the occupant is its kinetic energy, which has to be dismantled, this can also be expressed via the mass of the occupant $m_{occ}$ and its speed to be dismantled, $\Delta v$: $E_{occ} = \frac{1}{2} m_{occ} \Delta v^2$, so that the correct expression is:

$$\overline{F} = \frac{\frac{1}{2} m_{occ} \Delta v^2}{s_{defo} + s_{int}}.$$

As a physical law, this formulation is generally valid and relevant. However, the expression by itself does not provide any indication as to how to obtain a method applicable in practice during a collision for the determination of the force required to restrain the occupant, which force is also a measure of the severity of the accident. Here, exemplary embodiments of the present invention come into play.

In the following description of advantageous exemplary embodiments of the present invention, identical or similar reference characters are used for elements shown in the various Figures and having similar functions, and repeated description of these elements is omitted.

Figure 1:
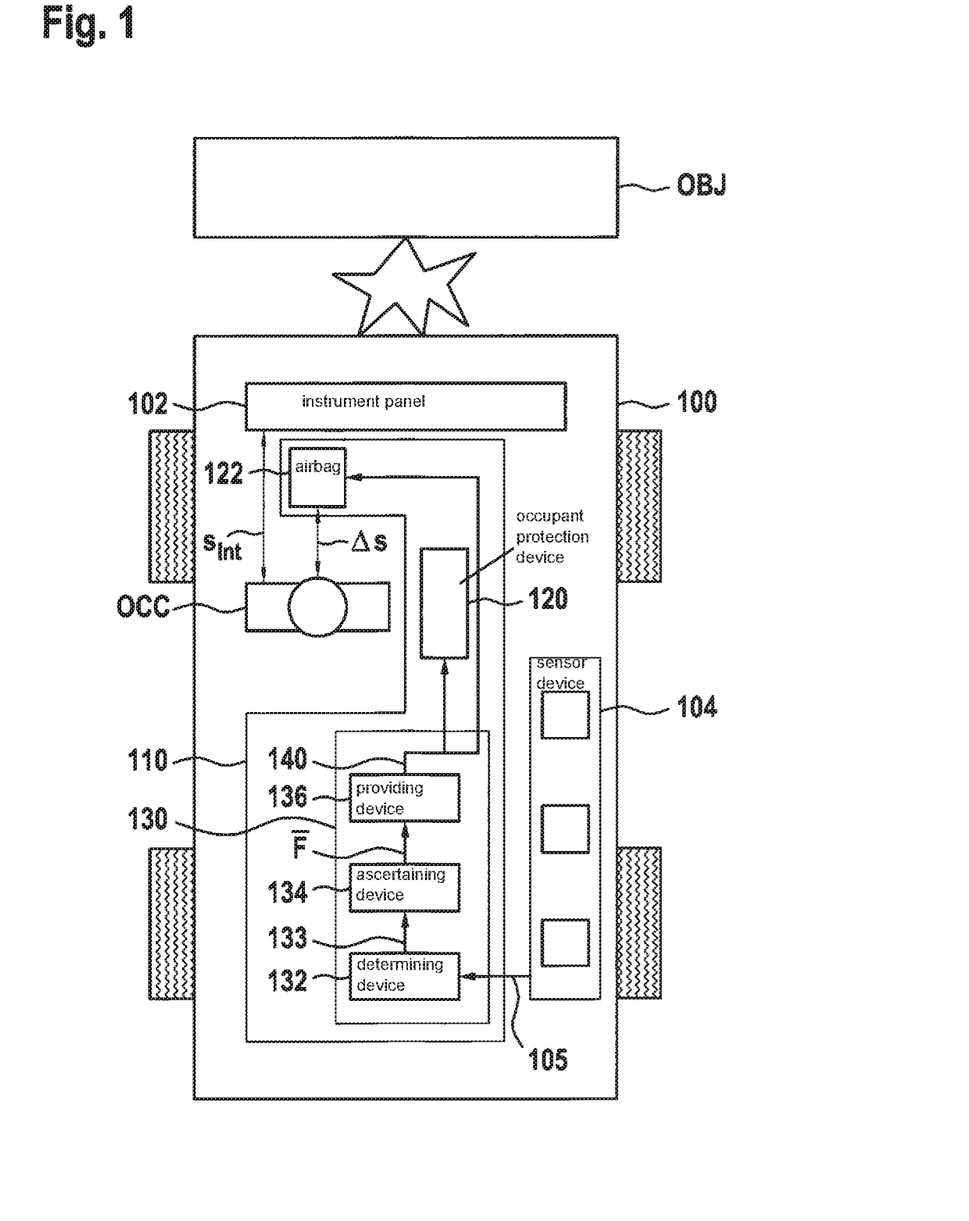
FIG. 1 shows a schematic representation of a system for occupant protection according to an exemplary embodiment in a vehicle.

FIG. 1 shows a schematic representation of a system 110 for occupant protection according to an exemplary embodiment, in a vehicle 100. Vehicle 100 is a motor vehicle, for example a passenger car or a utility vehicle. In FIG. 1, a collision occurs between the vehicle and a collision object OBJ. Collision object OBJ is for example another vehicle or a stationary object.

Vehicle 100 has an instrument panel 102, a sensor device 104, and system 110 for occupant protection, or occupant protection system 110. In addition, as an example only one occupant OCC is situated in vehicle 100.

Sensor device 104 has at least one vehicle sensor. According to the exemplary embodiment shown here, sensor device 104 has a plurality of vehicle sensors, as is indicated in FIG. 1 by only three units, shown as examples, within sensor device 104. The vehicle sensors can be situated in distributed fashion in vehicle 100. The at least one vehicle sensor of sensor device 104 is designed to provide a sensor signal 105. Sensor device 104, or the at least one vehicle sensor of sensor device 104, is designed to acquire the collision, a surrounding environment of vehicle 100, an interior compartment of vehicle 100, at least one property of vehicle 100, driving data of vehicle 100, at least one property of vehicle occupant OCC, and/or at least one property of collision object OBJ. At least one vehicle sensor can be provided in the form of a camera or some other optical acquisition device.

Occupant protection system 110 has at least one occupant protection device 120, 122, and a control device 130. According to the exemplary embodiment shown in FIG. 1, occupant protection system 110 has for example only one occupant protection device 120 and a further occupant protection device in the form of an airbag 122. Occupant protection device 120, airbag 122, and control device 130 are here connected to one another so as to be capable of transmitting signals.

Occupant protection devices 120 and 122 are designed to protect vehicle occupant OCC during the collision between vehicle 100 and collision object OBJ. Occupant protection device 120 can have at least one restraint device, at least one adjustable absorber device for absorbing the energy of a collision, a retractable steering wheel, a retractable instrument panel, a movable vehicle seat, and/or an operating brake of vehicle 100.

Control device 130 is connected at least to sensor device 104, or to the at least one vehicle sensor, so as to be capable of signal transmission. Control device 130 is designed to control occupant protection devices 120 and 122 when there is a collision, for example during the collision between vehicle 100 and collision object OBJ. Control device 130 has a determining device 132, an ascertaining device 134, and a providing device 136.

Determining device 132 of control device 130 is designed to determine input data 133. Input data 133 represent an ignition time of airbag 122 of vehicle 100, an angular frequency of the collision, an available displacement path $s_{int}$ of a vehicle occupant OCC relative to vehicle 100, a mass m of vehicle occupant OCC of vehicle 100, a distance $\Delta s$ of vehicle occupant OCC from airbag 122, and an inflation time duration of airbag 122.

Ascertaining device 134 of control device 130 is designed to ascertain a restraint force $\overline{F}$, or F, using the input data 133 from determining device 132. Restraint force $\overline{F}$ represents a force that can be provided by occupant protection device 120 that is suitable to minimize the occupant energy of vehicle occupant OCC up until the end of the collision.

Provision device 136 of control device 130 is designed to provide a control signal 140 for controlling occupant protection device 120. Control signal 140 is produced by control device 130 using restraint force $\overline{F}$ from ascertaining device 134.

According to an exemplary embodiment, determining device 132 is designed to determine input data 133 using the sensor signal 105 of at least one vehicle sensor of sensor device 104, using at least one modeling parameter of a vehicle model, of an occupant model, and/or of a collision model, and/or using at least one preset value for input data 133. Determining device 132 can be designed to read in the at least one modeling parameter and/or the at least one preset value from a storage device of vehicle 100 and/or of control device 130.

According to an exemplary embodiment, determining device 132 is also designed to determine the angular frequency of the collision from a plurality, predefined as a function of a recognized collision type, of preset values or value ranges. Here, preset values and/or prespecified value ranges can be stored in a storage device of vehicle 100 and/or of control device 130. According to an exemplary embodiment, control device 130 is designed to recognize the type of collision using at least one sensor signal of at least one vehicle sensor for collision acquisition and/or environmental acquisition. The recognized collision type, for example front impact, side impact, impact with partial overlap, or the like, can then be used by determining device 132 in order to determine the angular frequency.

In addition, according to an exemplary embodiment determining device 132 is designed to read in displacement path $s_{int}$ and/or distance $\Delta s$ as a preset value, for example from a memory device of vehicle 100 and/or of control device 130. In addition or alternatively, determining device 132 is designed to determine displacement path $s_{int}$ and/or distance $\Delta s$ using at least one vehicle sensor of sensor device 104. According to an exemplary embodiment, determining device 132 is also designed to determine the mass using a weight determining device of vehicle 100. The weight determining device can be part of sensor device 104. In addition, according to an exemplary embodiment determining device 132 is designed to read in the ignition time and/or the inflation time duration of the at least one airbag 122, represented by values stored in vehicle 100.

According to an exemplary embodiment, provision device 136 is designed to provide, as control signal 140, a control signal 140 that, as a function of at least one threshold value decision, brings about a controlling of at least one occupant protection device 120, 122 of a plurality of occupant protection devices 120, 122 of different types and/or at different positions in vehicle 100. In addition or alternatively, according to an exemplary embodiment provision device 136 is designed to provide, as control signal 140, a control signal 140 that brings about a controlling of at least one occupant protection device 120, 122 at a time that is a function of at least one threshold value decision.

According to an exemplary embodiment, provision device 136 is designed to provide, as control signal 140, a control signal 140 that brings about a controlling of at least one occupant protection device 120, 122 using a mathematical function of the ascertained restraint force $\overline{F}$. This mathematical function here has at least one parameter that is a function of a preset rule, of at least one acquired property of vehicle occupant OCC, and/or of an acquired temperature in an interior compartment of vehicle 100 and/or in a surrounding environment of vehicle 100.

According to an exemplary embodiment, ascertaining device 134 is designed to ascertain restraint force $\overline{F}$ as a function of a seat position of vehicle occupant OCC. Correspondingly, providing device 136 is designed to provide a control signal 140 that as a function of a seat position of vehicle occupant OCC.

Figure 2:
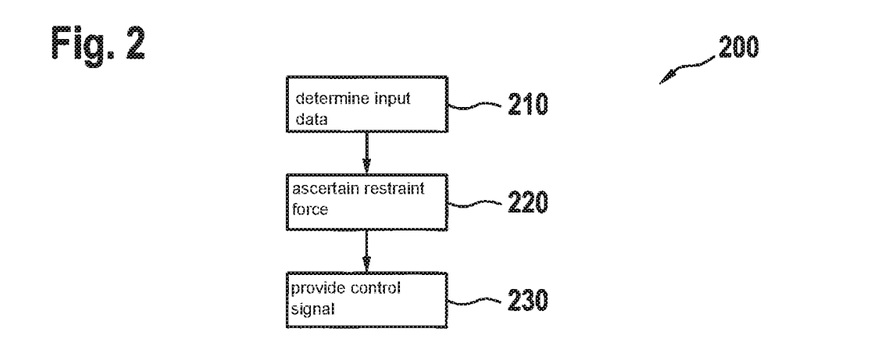
FIG. 2 shows a flow diagram of a method for controlling according to an exemplary embodiment.

FIG. 2 shows a flow diagram of a method 200 for controlling according to an exemplary embodiment. At least one occupant protection device for a vehicle can be controlled during a collision by carrying out method 200 for controlling. Method 200 for controlling is here capable of being carried out using the control device of FIG. 1, or a similar control device, and/or in connection with the occupant protection system of FIG. 1, or a similar occupant protection system.

In a step 210 of determining, input data are determined in method 200 for controlling. The input data represent a time of ignition of an airbag of the vehicle, an angular frequency of the collision, an available displacement path of a vehicle occupant relative to the vehicle, a mass of the occupant of the vehicle, a distance of the occupant from the airbag, and an inflation time duration of the airbag.

In the following, in the method 200 for controlling, in a step 220 of ascertaining a restraint force is ascertained using the input data determined in step 210 of determining. The restraint force represents a force that can be provided by the at least one occupant protection device and that is suitable to minimize the occupant energy of the vehicle occupant up until the end of the collision.

Subsequently, in a step 230 of providing in method 200 for controlling, a control signal is provided for controlling the at least one occupant protection device. The control signal is produced using the restraint force ascertained in step 220 of ascertaining.

In the following, exemplary embodiments and advantages of exemplary embodiments are again presented in summarized fashion and in other words, with reference to the above-described FIGS. 1 and 2, and with reference to FIGS. 3 and 4.

Method 200 for controlling is also distinguished in particular in that it does without the explicit use of the variables change of speed during collision $\Delta v$ and deformation $s_{defo}$, and instead uses variables that can be determined more easily in an early phase of the collision. For this purpose, the generally valid equation $$\overline{F} = \frac{\frac{1}{2} m_{occ} \Delta v^2}{s_{defo} + s_{int}}$$

is replaced by an expression that holds precisely in particular under the assumption that the collision process is taking place in accordance with a modeling assumption. The modeling assumption that is applied here states that the deceleration of the vehicle behaves analogously to a harmonic oscillator, and accordingly the acceleration-time characteristic of the vehicle a(t) corresponds to the equation a(t)=A·sin(ωt). This modeling assumption is conventional, but until now no technical application as described in the following has been derived from it. In an intermediate form, the following then holds for the average force $\overline{F}$:

$$\overline{F} = \frac{\frac{1}{2} m_{occ} A^2}{A + \omega^2 s_{int}}.$$

According to specific embodiments, the problem of practical applicability that still exists in this formulation can in particular also be solved. In particular, the determination of the maximum amplitude of the acceleration signal, A, from the acceleration signal with the precision required for a controlling of the restraint device or occupant protection device 120, 122 is first possible at a time at which the controlling of the restraint device or occupant protection device 120, 122 should in many cases already have taken place.

Therefore, method 200 for controlling uses as basis for the controlling, instead of the amplitude, a variable that can be determined significantly earlier, namely the ignition time of the at least one airbag 122, to a particular approximation. If the sin in the above equation is approximated as a series expansion, the following results as an adequately good approximation:

$$a(t) = A\omega t - \frac{A\omega^3}{6} t^3.$$

From this, an expression can be derived for the correct optimal ignition time TTF:

$$TTF = \sqrt[3]{\frac{6\Delta s}{A\omega}} - \Delta t \, TTF = \sqrt[3]{\frac{6\Delta s}{A\omega}} - \Delta t,$$

where $\Delta s$ is the distance of the occupant from a fixed position of the airbag and $\Delta t$ is the duration time of the airbag. This expression can be solved for A:

$$(TTF + \Delta t)^3 = \frac{6\Delta s}{A\omega}.$$

Thus, $$A = \frac{6\Delta s}{\omega(TTF + \Delta t)^3}.$$

This can now be used in the equation for determining the average restraint force $\overline{F}$. A central equation of the method according to the present invention thus results as:

$$\overline{F}(TTF, \omega, s_{int}, m_{occ}, \Delta s, \Delta t) = \frac{\frac{1}{2} m_{occ} \cdot \left(\frac{6\Delta s}{\omega(TTF + \Delta t)^3}\right)^2}{\frac{6\Delta s}{\omega(TTF + \Delta t)^3} + \omega^2 s_{int}}.$$

Thus, the average restraint force $\overline{F}$ to be applied, or the accident severity (because there is a correlation between the restraint force and the accident severity) is a function of the ignition time TTF, the angular frequency $\omega$, the forward displacement space $s_{int}$ available for the occupant, the occupant's mass $m_{occ}$, the position of the occupant relative to airbag $\Delta s$, and the inflation time $\Delta t$. This relation is also shown graphically in FIG. 3.

Figure 3:
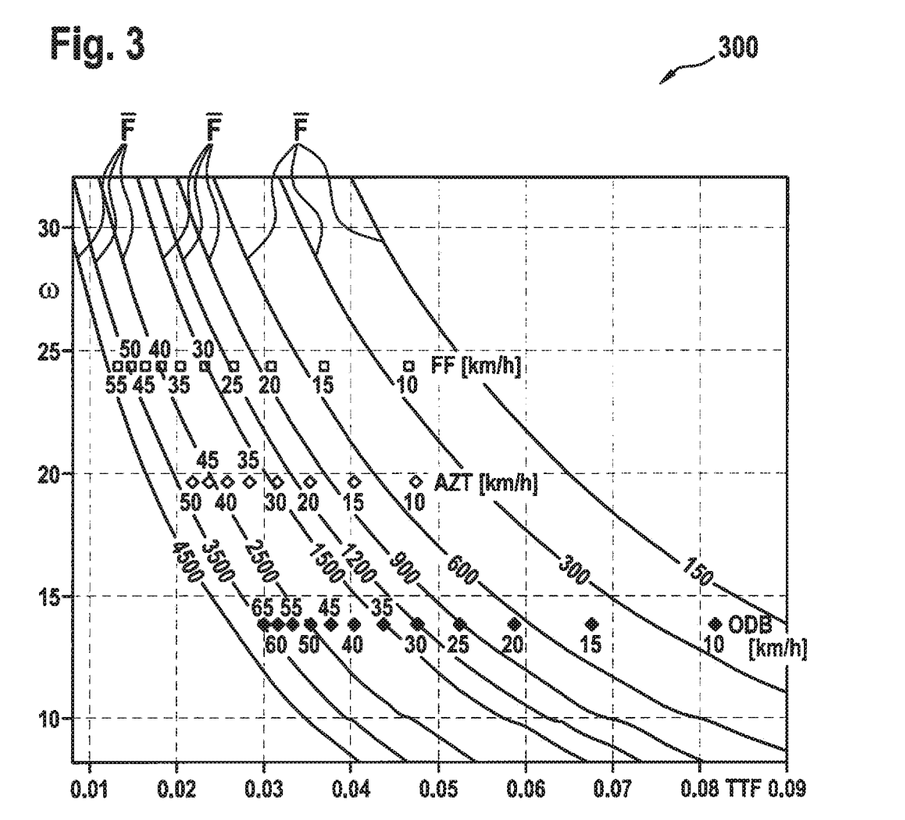
FIG. 3 shows a schematic ignition time-angular frequency diagram in connection with the system of FIG. 1, or with the method of FIG. 2.

FIG. 3 shows a schematic ignition time-angular frequency diagram 300, in connection with the system of FIG. 1, or the method of FIG. 2. Here, an ignition time TTF (Time To Fire) of the at least one airbag of the vehicle is plotted on an abscissa, and an angular frequency $\omega$ of a collision of the vehicle is plotted on an ordinate. In other words, FIG. 3 shows a two-dimensional representation of a relation between ignition time TTF and angular frequency $\omega$ for a given combination of the forward displacement available to the occupant $s_{int}$, the occupant mass $m_{occ}$, the position of the occupant relative to the airbag $\Delta s$, and the inflation time $\Delta t$ of the airbag. The solid lines are lines of equal restraint force $\overline{F}$, in newtons. For orientation, in addition localizations are indicated for particular standard accident situations, FF (Full Frontal), AZT (Allianz Zentral für Technik [Allianz Center for Technology]), and ODB (Offset Deformable Barrier) for particular speeds in kilometers per hour.

With reference to the above-described FIGS. 1 through 3, in the following exemplary embodiments and advantages of exemplary embodiments are further presented in summarized form and in other words, and also with reference to FIG. 4.

Inflation time $\Delta t$ is an airbag-specific constant and can be stored in a storage device for use by control device 130. The available forward displacement space $s_{int}$ and the airbag-relevant distance $\Delta s$ can be determined using an interior compartment sensing system of sensor device 100 for, for example using video, radar, a seat position sensor, ultrasound, etc. If no sensing system is available, a standard position can be assumed and used. The effective occupant mass $m_{occ}$, which does not necessarily have to correspond to the real mass of occupant OCC, can be determined by a weight determining device of sensor device 104. If necessary, a value obtained in this way can be further transformed by weighting it with a factor or by mapping via another specifiable computing rule. Ignition time TTF of airbag 122 can be determined using any suitable method, e.g., the AIDA algorithm or the like, but should satisfy the general equation as indicated in the theoretical equation for TTF.

Angular frequency $\omega$ can also be determined from any suitable data that are available. In particular, when there is a collision against an object OBJ with full overlapping, $\omega$ can be set to a value $\omega_1$, and when there is only a partial overlapping of the fronts of the vehicles it can be set to a value $\omega_2$. The value of $\omega_1$ can be selected such that it is in the interval between, e.g., $$20\frac{1}{s} > \omega_1 > 30\frac{1}{s},$$

e.g., $$\omega_1 = 24\frac{1}{s}.$$

$\omega_2$ can be selected for example in the interval $$12\frac{1}{s} > \omega_2 > 20\frac{1}{s},$$

e.g., $$\omega_2 = 14\frac{1}{s}.$$

Of course, other interval boundaries and values can also be selected here. In particular, it can be advantageous to define a third interval for a further angular frequency $\omega_3$ that can settle for example in the range $$18\frac{1}{s} > \omega_3 > 21\frac{1}{s},$$

e.g., $$\omega_3 = 20\frac{1}{s}.$$

The result of the other intervals are then to be adapted accordingly. The third interval is advantageous in particular for accident situations in which a collision with another object OBJ or vehicle OBJ takes place at a slight angle and with partial overlapping. Additional intervals for other accident constellations can also be implemented, such as for collisions with small overlapping (small overlap situations). The determination as to which angular frequency $\omega$ is selected can be made on the basis of an offset recognition according to the existing art, e.g., using an up-front sensor system, through combinations of signals 105 of various sensors according to specific methods, or on the basis of pre-crash sensor systems. If sensors are available having adequate precision, a finer subdivision of angular frequency ω or of the value ranges can be carried out.

Figure 4:
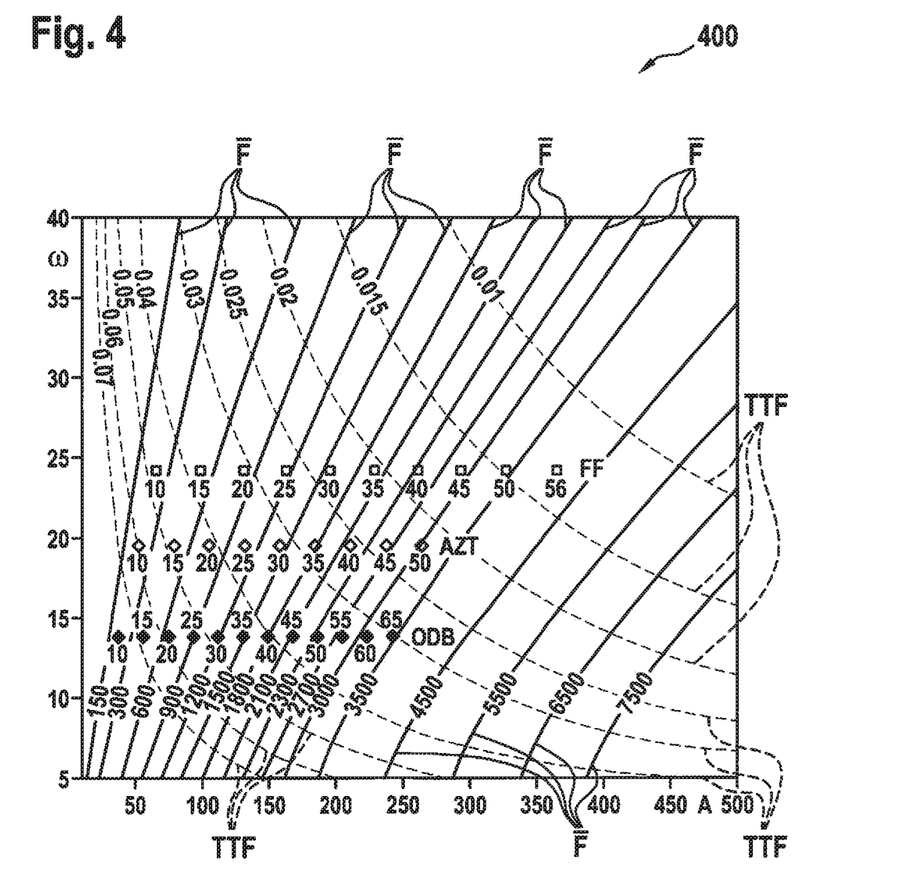
FIG. 4 shows a schematic amplitude-angular frequency diagram in connection with the system of FIG. 1, or with the method of FIG. 2.

The described method 200 for controlling is also based in particular on the following findings:

The knowledge of an ignition time TTF of airbag 122 in itself does not yet permit a determination of the restraint force $\overline{F}$ or of the severity of the accident. However, the ignition time TTF is related to the product Aω of the amplitude and angular frequency. In general, this product does not permit inference of the restraint force $\overline{F}$ or accident severity. It visually represents the initial climb of the acceleration signal at the origin. A graphic representation of the two functions $$\overline{F} = \frac{\frac{1}{2} m_{occ} A^2}{A + \omega^2 s_{int}} \text{ and } TTF = \sqrt[3]{\frac{6 \Delta s}{A \omega}} - \Delta t$$

shows this visually, as in FIG. 4.

FIG. 4 shows a schematic amplitude-angular frequency diagram 400, in connection with the system of FIG. 1, or the method of FIG. 2. Here, the amplitude of a collision of the vehicle is plotted on an abscissa, and an angular frequency ω of a collision of the vehicle is plotted on an ordinate. Solid lines represent lines of equal restraint force $\overline{F}$ in newtons. Dotted lines represent lines of equal ignition times TTF in seconds. In other words, FIG. 4 is a representation of restraint forces $\overline{F}$ and ignition times TTF (dotted lines) over amplitude A and angular frequency ω. It can be seen clearly that the ignition times TTF are independent of the restraint forces $\overline{F}$. For orientation, localizations are also indicated here for particular standard accident situations, illustrated only as examples by FF (Full Frontal), AZT (Allianz Zentrum für Technik), and ODB (Offset Deformable Barrier) for particular speeds, in kilometers per hour.

With reference to the above-described FIGS. 1 through 4, in the following exemplary embodiments and advantages of exemplary embodiments are further presented in summarized fashion and in other words.

If angular frequency ω is known, then for a given angular frequency ω a unique mapping of ignition time TTF onto restraint force $\overline{F}$, i.e., the accident severity, can be found. This is the function already indicated above:

$$\overline{F}(TTF, \omega, s_{int}, m_{occ}, \Delta s, \Delta t) = \frac{\frac{1}{2} m_{occ} \cdot \left( \frac{6 \Delta s}{\omega (TTF + \Delta t)^3} \right)^2}{\frac{6 \Delta s}{\omega (TTF + \Delta t)^3} + \omega^2 s_{int}}.$$

Because the ignition time TTF can be determined easily and conclusions about angular frequency ω can be made early in the case of collision, by applying this function it is possible to determine the accident severity quickly and precisely. Because the restraint force $\overline{F}$ as initial variable is a continuous physical variable, on this basis a large number of actuators can be controlled without additional adaptation outlay and application outlay in this core determining method. For the functioning of an application of this equation, the way in which the input variables or input data 133 are determined is not important. Thus, it can be used, without any modification outlay, with all possible combinations of measurement sensor equipment in vehicle 100. In this way, an adaptation outlay for different vehicle types is minimized.

Using the individual accident severity, in the form of the restraint force or average restraint force $\overline{F}$, according to an exemplary embodiment a controlling of occupant protection devices 120, 122, or restraint devices, can take place using thresholds, or threshold values. For example, if $\overline{F}>\text{Thd}_1$, then a restraint device A is activated, for $\overline{F}>\text{Thd}_2$ a restraint device B is activated, etc. Similarly, using the individual accident severity, or average restraint force $\overline{F}$, a time of a controlling or activation of occupant protection devices 120, 122, or restraint device, can be controlled: for example if $\overline{F}>\text{Thd}_{t1}$, an occupant protection device 120, 122 is activated at a first time $t_1$. If $\overline{F}>\text{Thd}_{t2}$ then an occupant protection device 120, 122 is activated at a second time $t_2$, etc.

Alternatively or in addition, an activation time of an occupant protection device 120, 122, or a restraint device or restraint system, can be calculated directly from the value of the average restraint force $\overline{F}$. Using a function $TTF_{RHS}=f(\overline{F})$, a triggering time is calculated directly here. An example of the function is $TTF_{RHS}=\overline{F}/a$, where a is a number that can be set arbitrarily.

Thus, it may for example be appropriate to switch a belt load limiter from a high force value to a lower one, for example at time $\overline{F}/100$ ms. For such a function, a however does not have to assume precisely the value 100; rather, a can also be a function of other variables, such as an occupant outline, a temperature, or some other variables relevant for protecting occupants. However, the function can also be realized by polynomials, trigonometric mappings, or other arbitrary mathematical functions, such that in particular cases the properties of the function can be modified by various applicable constants. Properties of the function, or a choice between different functions, can take place as a function of other variables.

According to an exemplary embodiment, the determination of the accident severity in the form of the average restraint force $\overline{F}$ can be done individually for different seat positions in vehicle 100. This is easily possible through the multiple use of the determination equation for the average restraint force $\overline{F}$ or of parts thereof, with different variables for an occupant position and occupant characteristic, and corresponding characteristic quantities for occupant protection devices 120, 122, or restraint devices.

If an exemplary embodiment has an "and/or" linkage between a first feature and a second feature, this is to be read as meaning that according to a first specific embodiment the exemplary embodiment has both the first feature and the second feature, and according to another specific embodiment the exemplary embodiment has either only the first feature or only the second feature.

What is claimed is:

1. A method for controlling at least one occupant protection device of a vehicle in response to a detection of an occurrence of a collision, the method comprising the following steps:
   determining input data, the input data representing an ignition time of an airbag of the vehicle, an angular frequency of the collision, an available displacement path of a vehicle occupant relative to the vehicle, a mass of the vehicle occupant of the vehicle, a distance of the vehicle occupant to the airbag, and an inflation time duration of the airbag;
   ascertaining a restraint force using the input data, the restraint force representing a force that can be provided by the at least one occupant protection device and that minimizes an occupant energy of the vehicle occupant during the collision up until an end of the collision; and providing a control signal for controlling the at least one occupant protection device, the control signal being produced using the restraint force.

2. The method as recited in claim 1, wherein:
in the ascertaining step, the restraint force is ascertained using the following equation:

$$\overline{F}(TTF, \omega, s_{int}, m_{occ}, \Delta s, \Delta t) = \frac{\frac{1}{2}m_{occ} \cdot \left(\frac{6\Delta s}{\omega(TTF + \Delta t)^3}\right)^2}{\frac{6\Delta s}{\omega(TTF + \Delta t)^3} + \omega^2 s_{int}};$$

$\overline{F}$ represents the restraint force;
TTF represents the ignition time;
$\omega$ represents the angular frequency;
$s_{int}$ represents the displacement path;
$m_{occ}$ represents the mass;
$\Delta s$ represents the distance; and
$\Delta t$ represents the inflation time duration.

3. The method as recited in claim 1, wherein, in the determining step, the input data are determined using at least one sensor signal of at least one vehicle sensor, using at least one modeling parameter of a vehicle model, of an occupant model, and/or of a collision model, and/or using at least one preset value for the input data.

4. The method as recited in claim 1, wherein, in the determining step, the angular frequency is determined from a plurality of preset values or value ranges, predefined as a function of a recognized type of the collision.

5. The method as recited in claim 4, wherein the type of collision is recognized using at least one sensor signal of at least one vehicle sensor for collision acquisition and/or for acquiring a surrounding environment.

6. The method as recited in claim 1, wherein, in the determining step, the displacement path is read in as a preset value and/or is determined using at least one vehicle sensor, the distance is read in as a preset value and/or using at least one vehicle sensor, the mass is determined using a weight determining device of the vehicle, the ignition time is read in as a value stored in the vehicle, and/or the inflation time duration is read in as a value stored in the vehicle.

7. The method as recited in claim 1, wherein, in the providing step, the provided control signal, as a function of at least one threshold value decision, brings about a controlling of at least one occupant protection device of a plurality of occupant protection devices of different types and/or at different positions in the vehicle.

8. The method as recited in claim 1, wherein, in the providing step, the provided control signal brings about a controlling of at least one occupant protection device at a time that is a function of at least one threshold value decision.

9. The method as recited in claim 1, wherein, in the providing step, the provided control signal brings about a controlling of at least one occupant protection device using a mathematical function of the ascertained restraint force, the mathematical function having at least one parameter, that is a function of a preset rule, of at least one property of:
the vehicle occupant; and/or
a temperature in an interior compartment of the vehicle; and/or
a surrounding environment of the vehicle.

10. The method as recited in claim 1, wherein, in the ascertaining step, the restraint force is ascertained as a function of a seat position of the vehicle occupant, a control signal that is a function of a seat position of the vehicle occupant being provided in the providing step.

11. A control device configured to control at least one occupant protection device of a vehicle in response to a detection of an occurrence of a collision, the control device configured to:
determine input data, the input data representing an ignition time of an airbag of the vehicle, an angular frequency of the collision, an available displacement path of a vehicle occupant relative to the vehicle, a mass of the vehicle occupant of the vehicle, a distance of the vehicle occupant to the airbag, and an inflation time duration of the airbag;
ascertain a restraint force using the input data, the restraint force representing a force that can be provided by the at least one occupant protection device and that is minimizes an occupant energy of the vehicle occupant during the collision up until an collision; and
provide a control signal for controlling the at least one occupant protection device, the control signal being produced using the restraint force.

12. A system for occupant protection for a vehicle, the system comprising:
at least one occupant protection device of the vehicle; and
a control device connected to the at least one occupant protection device and configured to control the at least one occupant protection device in response to a detection of an occurrence a collision, the control device configured to:
determine input data, the input data representing an ignition time of an airbag of the vehicle, an angular frequency of the collision, an available displacement path of a vehicle occupant relative to the vehicle, a mass of the vehicle occupant of the vehicle, a distance of the vehicle occupant to the airbag, and an inflation time duration of the airbag;
ascertain a restraint force using the input data, the restraint force representing a force that can be provided by the at least one occupant protection device and that is minimizes an occupant energy of the vehicle occupant during the collision up until an end of the collision; and
provide a control signal for controlling the at least one occupant protection device, the control signal being produced using the restraint force.

13. A non-transitory machine-readable storage medium on which is stored a computer program for controlling at least one occupant protection device of a vehicle in response to a detection of an occurrence of a collision, the computer program, when executed by a computer, causing the computer to perform the following steps:
determining input data, the input data representing an ignition time of an airbag of the vehicle, an angular frequency of the collision, an available displacement path of a vehicle occupant relative to the vehicle, a mass of the vehicle occupant of the vehicle, a distance of the vehicle occupant to the airbag, and an inflation time duration of the airbag;
ascertaining a restraint force using the input data, the restraint force representing a force that can be provided by the at least one occupant protection device and that is minimizes an occupant energy of the vehicle occupant during the collision up until an end of the collision; and providing a control signal for controlling the at least one occupant protection device, the control signal being produced using the restraint force.

\* \* \* \* \*